(12) United States Patent
Arnold et al.

(10) Patent No.: US 8,235,192 B2
(45) Date of Patent: Aug. 7, 2012

(54) CLUTCH UNIT

(75) Inventors: Johannes Arnold, Achern (DE); Oliver Noehl, Buehlertal (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 0 days.

(21) Appl. No.: 13/185,763

(22) Filed: Jul. 19, 2011

(65) Prior Publication Data

US 2011/0272233 A1 Nov. 10, 2011

Related U.S. Application Data

(63) Continuation of application No. PCT/DE2009/001810, filed on Dec. 22, 2009.

(30) Foreign Application Priority Data

Jan. 19, 2009 (DE) .................. 10 2009 005 075

(51) Int. Cl.
*F16D 13/68* (2006.01)
*F16D 21/06* (2006.01)
*F16D 25/10* (2006.01)

(52) U.S. Cl. ............... 192/48.8; 192/48.619; 192/55.61; 192/70.19

(58) Field of Classification Search .............. 192/70.19, 192/48.619, 55.61
See application file for complete search history.

(56) References Cited

U.S. PATENT DOCUMENTS

| 2,080,395 | A | * | 5/1937 | Begg et al. | ................ | 188/218 R |
| 5,520,271 | A | * | 5/1996 | Kohno et al. | ................ | 74/574.2 |
| 2007/0181395 | A1 | * | 8/2007 | Mueller et al. | ............... | 192/3.29 |
| 2008/0067023 | A1 | * | 3/2008 | Sahyoun et al. | ............ | 192/70.2 |

FOREIGN PATENT DOCUMENTS

| DE | 100 05 548 | A1 | | 8/2001 |
| DE | 103 10 831 | A1 | | 11/2003 |
| DE | 10 2005 027 610 | A1 | | 12/2005 |
| DE | 10 2006 026 373 | A1 | * | 1/2007 |
| EP | 1 610 016 | A1 | | 12/2005 |
| EP | 1 882 863 | A1 | | 1/2008 |

* cited by examiner

*Primary Examiner* — Rodney Bonck

(74) *Attorney, Agent, or Firm* — Lucas & Mercanti, LLP; Klaus P. Stoffel

(57) ABSTRACT

A clutch unit, which has at least one wet clutch that is arranged in a housing, which is driven by a drive unit. The clutch is effectively connected to an input part. To simultaneously associate a torsional vibration damper, e.g. a centrifugal pendulum, with the input part, a support disk of the torsional vibration damper is connected to the input part so that no or only minor vibrations are generated, allowing the frequency of the torsional vibration damper to be sufficiently adjusted. For this purpose, at least one plate support is connected to a single support disk which is fixedly mounted on the clutch hub and is thus made rigid. Preferably, the plate support further reduces vibration tolerance.

7 Claims, 7 Drawing Sheets

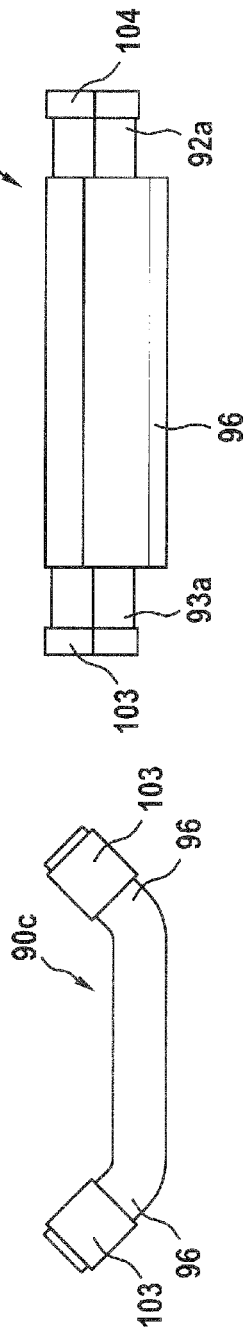
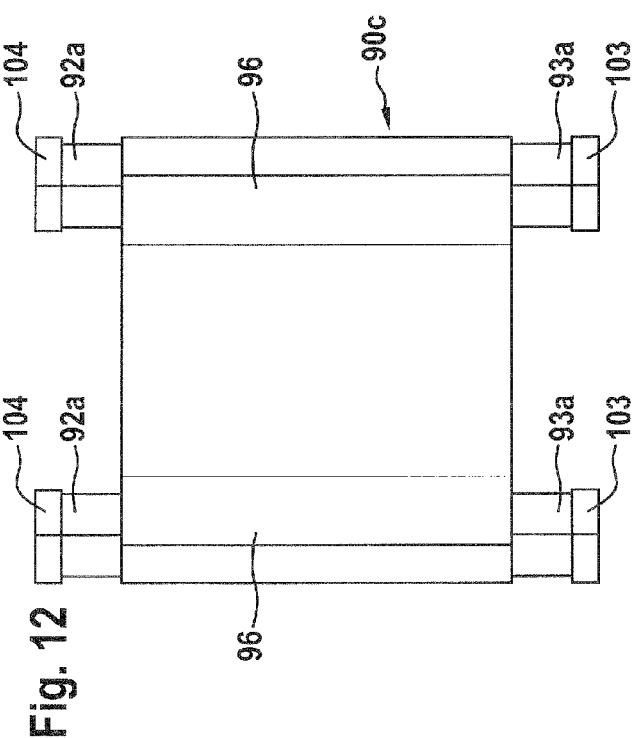

CLUTCH UNIT

This application is a continuation of PCT/DE2009/001810 filed Dec. 22, 2009, which in turn claims the priority of DE 10 2009 005 075.2 filed Jan. 19, 2009. The priority of both applications is hereby claimed and both applications are incorporated by reference herein.

FIELD OF THE INVENTION

The invention relates to a clutch unit with two wet clutches arranged one above the other and with a torsional vibration absorber.

BACKGROUND OF THE INVENTION

The use of torsional vibration absorbers, for example centrifugal pendulums, in a drive train is known from DE 103 108 31 A1. Furthermore, clutch units with wet clutches are known. For example, DE 10 2005 027 610 A1 discloses a clutch unit with two wet clutches arranged radially one above the other.

It is difficult to accommodate a torsional vibration absorber in the wet space of the clutch unit, since sufficient tuning of the resonant range has to be ensured. In particular, torsional backlash of torque-transmitting connecting parts contributes to a disturbance in the resonant range.

SUMMARY OF THE INVENTION

The object of the invention is the further development of the use of torsional vibration absorbers in the drive train of motor vehicles, particularly in conjunction with wet clutches accommodated in a housing.

The invention is achieved by means of a clutch unit for a drive train with a drive unit and with a following transmission having at least one wet clutch arranged in a housing driven by the drive unit, with lamellae and friction lamellae received in an input-side and an output-side lamella carrier and alternating in the axial direction, the input-side lamella carrier being connected fixedly to a carrier disk received fixedly on a clutch hub, and a torsional vibration absorber, for example a centrifugal pendulum, being arranged on the carrier disk. Advantageously, a torsional vibration damper may be connected in parallel to the torsional vibration absorber and may be arranged effectively between the at least one wet clutch and the housing. For example, an input part of the wet clutch can at the same time be the output part of the torsional vibration damper.

In this case, a tie-up of the torsional vibration absorber to the input part of the at least one wet clutch via the input-side lamella carrier is provided. In this case, if, for example, deep-drawn lamella carriers produced by means of sheet metal forming methods are used, the situation cannot sufficiently be ruled out where connections to the torque-transmitting connecting components are subject to play because form fits are made insufficiently or can be made only in high outlay manufacturing terms, so that vibration problems may arise particularly during the actuation of the at least one wet clutch. For example, rattling or clattering noises or other vibratory effects may arise, which are uncomfortable and moreover adversely influence the functioning of the torsional vibration absorber, so that it may be possible that a torsional vibration absorber cannot even be used in this position. It has therefore proved especially advantageous if at least one lamella carrier, for example the input-side lamella carrier of the at least one wet clutch, is designed as a built-up lamella carrier which has bearing faces, capable of being produced axially in a planar manner, between the flange part of the input part, on the one hand, and the carrier disk of the torsional vibration absorber, on the other hand.

According to an advantageous exemplary embodiment, the built-up lamella carrier is formed from circumferentially distributed connection elements which connect an input part, designed as a flange part of the at least one wet clutch, to the carrier disk in an axially spaced-apart and play-free manner. Owing to the planar bearing faces of the connection elements on the flange part or on the carrier disk, an especially rigid tie-up of the carrier disk to the input part of the wet clutch is achieved, so that the transmission of torque from the input part to the torsional vibration absorber can be defined and can take place without play, and therefore the torsional vibration absorber, for example a centrifugal pendulum, can be rated especially well for the desired resonant frequency or for a narrow resonant range.

It has in this case proved to be especially advantageous to connect in parallel to the torsional vibration absorber a torsional vibration damper which is arranged between the housing and the at least one wet clutch and the output part of which is likewise formed by the flange part of the input part of the at least one wet clutch. Furthermore, the at least one wet clutch may be provided, for example, from two wet clutches, arranged radially one above the other, for a dual clutch transmission, in which case one, preferably the radially outer lamella carrier or both input-side lamella carriers of the two wet clutches can be built up.

A lamella carrier built up in this way is advantageously equipped with connection elements which are riveted to the flange part and the carrier disk. These connection elements at the same time form the rotary take-up for the lamellae, for example produced from steel, at the same time with axially limited displaceability, so that, in the case of an alternating arrangement of lamellae and of friction lamellae assigned to the output side of the at least one wet clutch and provided with friction linings, the wet clutch can, in a directed manner, be opened, closed and operated with slip, as a function of axial action upon the stack of lamellae thus formed, by a pressure-loadable piston against a fixed end lamella formed, for example, by the flange part. Rotary take-up in this case takes place by means of recesses, complementary with the cross-sectional profiles of the connection elements, of the lamellae, in particular over their outer circumference, so that the input-side lamellae can be suspended in the connection elements with the form fit in the circumferential direction and so as to be axially displaceable to a limited extent.

Particularly for reasons of stability, the connection elements may have on the end face in each case two rivet studs adjacent to one another in the circumferential direction and which pass through corresponding orifices in the flange part and in the carrier disk and are subsequently riveted together. In this case, in an advantageous exemplary embodiment with an end lamella formed from the flange part, for assembly reasons lamellae and friction lamellae are threaded onto the connection elements already connected, such as riveted, to the flange part, before the carrier disk is connected, such as riveted, to the connection elements.

Furthermore, particularly for reasons of stability of the lamella carrier, it has been shown to be advantageous if the connection elements have, for riveting to the flange part and/or to the carrier disk, rivet studs of polygonal cross section which pass through recesses, provided complementarily thereto, in the flange part and in the carrier disk and are in each case riveted on their sides facing away from the connection elements. In this case, the polygons may already be predetermined by virtue of their manufacture.

The connection elements may be formed from stepped bolts produced, for example, by cutting, the lamellae being suspended directly in the stepped bolts preferably of round cross section. In this case, at least three, for example six to thirty six, preferably nine to twenty four stepped bolts may be distributed over the circumference. Alternatively or additionally, the connection elements may be formed, for example, from three to sixteen, preferably twelve sheet metal parts which are angled radially outward at their circumferential ends, so that they have in cross section a tooth flank profile, on which the lamellae can be received fixedly in terms of rotation and displaceably. In this case, the rivet studs of the sheet metal parts may be provided on the flat and/or angled region of the sheet metal parts.

At least one, preferably a plurality of connection elements distributed over the circumference may have at least one pin which is widened axially in the direction of the housing and controls a friction device connected in parallel to the torsional vibration damper. In this case, the pins can control a friction disk which is braced with the housing, so that, if there is twisting of the housing with respect to the lamella carrier and therefore between the input and output parts of the torsional vibration damper, a frictional moment is generated which, in order to exhibit dragged friction, may also have torsional backlash, for example when the pins engage into longitudinal slots of the friction disk which are aligned over the circumference.

Furthermore, it has been shown to be advantageous if the torsional vibration damper is coupled to an input-side, such as primary, flywheel mass and an output-side, such as secondary, flywheel mass. For this purpose, according to another advantageous embodiment, the housing of the at least one wet clutch may be designed as a primary flywheel mass and the at least one wet clutch as a secondary flywheel mass.

The at least one wet clutch may advantageously be used in any form and independently of the configuration of its surroundings. It may be accommodated, for example, in a housing in which a pressure medium is used for cooling and actuating the pistons. In this case, the at least one wet clutch may be accommodated in the rotating wet space formed by the housing. Furthermore, the at least one wet clutch may be accommodated in a housing, the at least one wet clutch not being actuated by a hydraulically actuated piston, but instead, for example, by an electrical actuator, so that merely pressure medium as a coolant has to be metered and, correspondingly, there is no need for a rotating wet space. In particular, a torsional vibration absorber in the form of a centrifugal pendulum may in this case be designed independently of the pressure medium.

BRIEF DESCRIPTION OF THE DRAWINGS

The invention is explained in more detail by means of the exemplary embodiments illustrated in FIGS. 1 to 15 in which:

FIGS. 10 to 12 show a connection element, alternative to FIGS. 7 to 9, for the lamella carrier in various views.

DETAILED DESCRIPTION OF THE INVENTION

Figure 1:
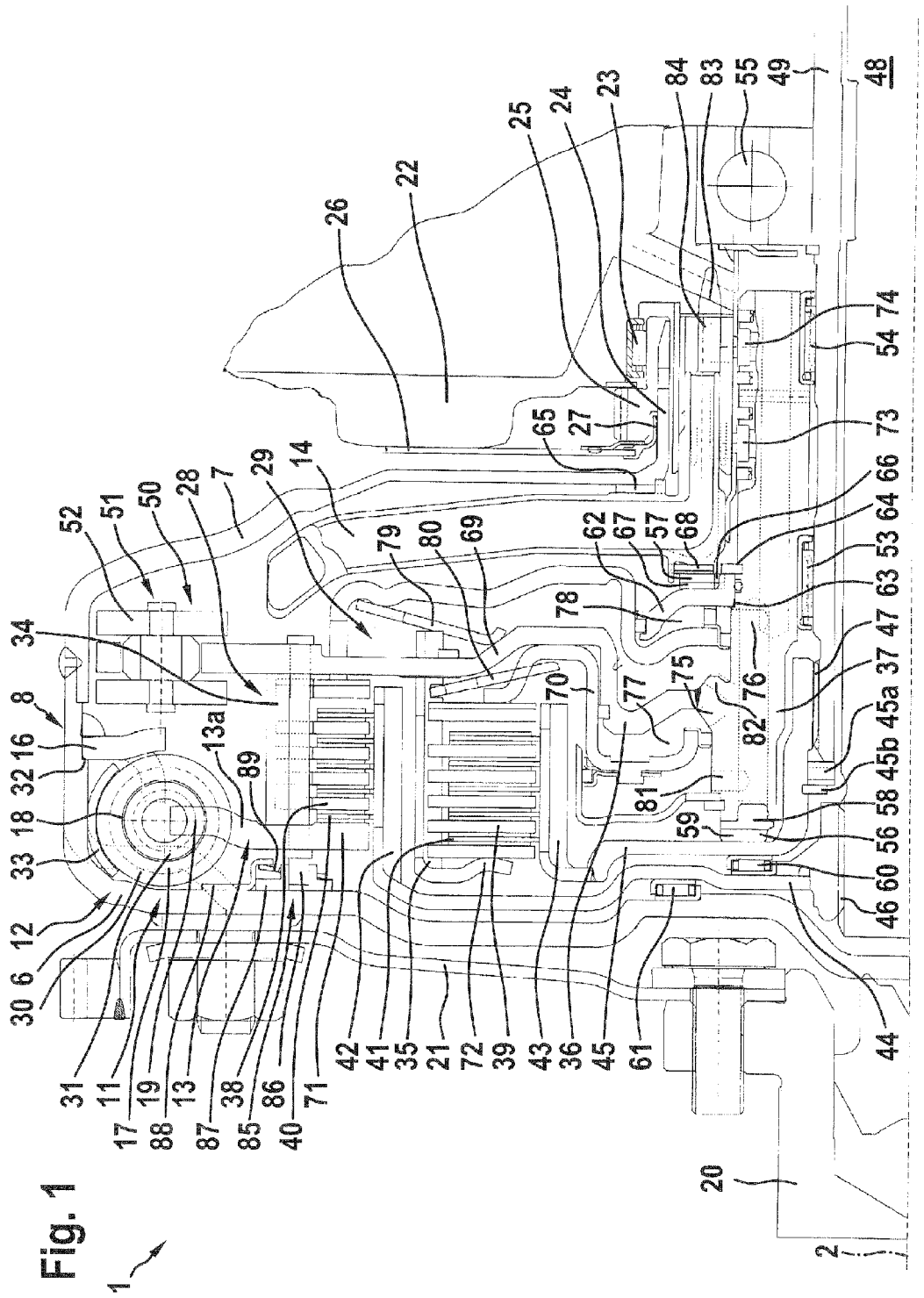
FIG. 1 shows a part section through a clutch unit according to the invention.

FIG. 1 shows the clutch unit 1 in the assembled state as a part section above the axis of rotation 2. The clutch unit 1 is arranged between the drive unit, of which only the crank shaft 20 is illustrated, and the transmission, of which only the transmission housing 22 is illustrated. The housing 8 of the clutch unit 1 is received on the crankshaft 20 by means of an axially flexible drive plate 21, such as a flexplate, compensating axial vibrations and wobbling vibrations of the crankshaft 20 and is driven by said drive plate. Furthermore, the housing 8 is supported rotatably on the transmission housing, 22 by means of the rolling bearing 23, the toothed ring 25 for the transmission oil pump, which can also circulate the pressure medium of the clutch unit 1, being arranged by means of a sleeve-shaped extension between the annular axial extension 24 of the housing part 7 and the rolling bearing 23 and being driven by the extension 24. The pump drive formed from the toothed ring 25 and the rolling bearing 23, which via the toothed ring 25 also forms a mounting for the housing 8 on the housing wall of the transmission housing 22, is preferably premounted on the transmission housing 22, while, during the connection of clutch unit 1 and transmission, the scoop pipe 14 is centered in the feed device, and the guide pins 83 pass through this and are received in the transmission housing 22 axially displaceably and so as to support the scoop pipe 14 fixedly in terms of rotation. A sealing disk 26 made, for example, from sheet metal or plastic and having a seal 27, such as a radial shaft sealing ring, to the extension 24 is provided on the axial extension 24 for sealing off the housing 8 with respect to the transmission housing 22.

The torsional vibration damper 12 and the two wet clutches 28, 29 arranged radially one above the other are received inside the housing 8 at least partially filled with pressure medium. The input part of the torsional vibration damper 12 is in this case formed by the housing which acts in the circumferential direction upon the circumferentially active energy accumulators 11, which, in the exemplary embodiment shown, are formed from preferably two bow spring groups, arranged over the circumference and in each case with two how springs 30, 31 rested radially one in the other, by means of the drivers 17, 18 which engage radially into the end faces of the bow springs 30, 31. The drivers 17 are in this case formed from shaped portions of the housing part 6 which are arranged over the circumference and the drivers 18 by stepped-out regions of the annular flange part 16. After the insertion of the bow springs 30, 31, the annular flange part 16 is laid against the radial shoulder 32 of the housing part 6 and axially fixed, such as, for example, welded, and serves for the captive reception of the bow springs 30, 31 before mounting and for the axial guidance of the bow springs 30, 31 during operation. Between the bow springs 30 and the radially outer region of the housing part 6, a wear protection shell 33 is provided, which are arranged in two parts in the circumferential direction between the drivers 17 can be mounted floatingly with respect to the housing 8.

The torsional vibration damper 12 is active in the torque flux upstream of the wet clutches 28, 29, so that the output part of the torsional vibration damper 12 is at the same time the common input part 13 of the wet clutches 28, 29. For this purpose, the input part 13 has a flange part 13a with the output-side drivers 19 of the torsional vibration damper 12 which are designed as radially widened arms of the flange part 13a and which, in the non-braced state of the bow springs 30, 31, act on the same circumference of the drivers 17, 18 upon the end faces of the bow springs 30, 31 and consequently cause a bracing of the bow springs 30, 31 in the event of relative rotation of the housing 8 with respect to the input part 13 of the wet clutches 28, 29, so that the torque peaks causing such relative rotations are damped, in that the bow springs active as energy accumulators 11 briefly store intermediately the energy of these torque peaks.

The torque of the drive unit is introduced into the input part 13 via the torsional vibration damper 12. The input part 13 distributes the torque to the input-side lamella carriers 34, 35 of the wet clutches 28, 29 which are centered and mounted by means of a common carrier disk 36 which is fixedly connected, such as welded, to the clutch hub 37. In this case, the radially outer lamella carrier 34 is produced in the built-up manner, while the radially inner lamella carrier 35 is deep-drawn. For example, as shown, a centrifugal pendulum 51 with centrifugal weights 52 displaceable to a limited extent with respect to the carrier disk 36 in the circumferential direction and the radial direction is arranged radially on the outside, and preferably spaced apart axially, and at radially the same height on the carrier disk 36 of the torsional vibration absorber 50. In each case, lamellae 38, 39 are suspended in the input-side lamella carrier 34, 35 which alternate axially with output-side friction lamellae 40, 41 and, when acted upon axially, form frictional engagement. The output-side friction lamellae 40, 41 are suspended in lamella carriers 42, 43 which are in each case connected, such as welded, to a hub 44, 45, to a toothing 46, 47, to the transmission input shaft 48 or to the transmission input shaft 49 arranged around said transmission input shaft and designed as a hollow shaft and are therefore mounted and centered on both transmission input shafts 48, 49.

In the non-installed state of the clutch unit 1, the two wet clutches 28, 29 are configured together with the clutch hub 37 as a structural unit. After installation, the clutch hub 37 is floatingly mounted axially on the transmission input shaft 49 by means of the rolling bearings 53, 54. The transmission input shaft 49 is fixedly mounted in the transmission housing 22 axially and radially by means of the rolling bearing 55.

The floating mounting of the clutch hub 37 is limited by the two run-on disks 56, 57. The run-on disk 56 is formed in one part from plastic and contains formed the carrier part 58 introduced into the end face of the clutch hub 37 and the lubricating oil grooves 59. The hub 45 is attached axially and rotatably with respect to the hub 44 by means of the rolling bearing 60. The hub 44 is supported rotatably on the housing part 6 axially fixedly by means of the rolling bearing 61, so that the clutch hub 37 is supported axially via the shim disk 67, in that, for example, a defined play is set by the latter. The axial prestress necessary for the bearings 60, 61 is set by means of the axially active energy accumulator 45a, for example a corrugated spring, which is supported on the transmission input shaft 49 by means of the securing disk 45b. The clutch hub 37 is supported in the opposite direction, by means of the sealing plate 62 which is arranged axially fixedly on said clutch hub at the shoulder 63 by means of the securing ring 64, on the scoop pipe 14, which, in turn, is supported axially on the housing part 7 by means of the run-on disk 65, which may be designed as a rolling bearing. Between the sealing plate 62 and the scoop pipe 14 is arranged the axially active run-on disk 57 which allows an axially limited displacement of the clutch hub 37 counter to its action in the direction of the housing part 7, so that the clutch hub 37 is mounted so as to be displaceable with respect to the housing 8 in both directions to an axially limited extent and therefore in the floating manner. The run-on disk 57 is formed from a carrier disk 66 meshed with the sealing plate 62 and a shim disk 67 which is received fixedly thereon and which comes into contact with a run-on disk 68 meshed with the scoop pipe 14.

The two wet clutches 28, 29 are acted upon by pistons 69, 70 which are displaceable axially by means of a pressure medium and which press the lamellae 38 or 39 axially together with the friction lamellae 40 or 41 against an end lamella 71, 72 and thereby form frictional engagement. For this purpose, the pressure medium is in each case conducted via rotary leadthroughs 73, 74 into supply lines 75, 76 and metered into the pressure chambers 77, 78, with the result that the pistons 69, 70 are displaced counter to the action of the axially active energy accumulators 79, 80 and the wet clutches 28, 29 are thereby closed, depending on the applied pressure of the pressure medium. When the pressure in the pressure chambers 77, 78 is reduced, the wet clutches are opened again automatically as a result of the expansion of the energy accumulators 79, 80. The supply lines 81, 82 serve for cooling the wet clutches 28, 29, in particular the friction linings of the friction lamellae 40, 41, which are exposed to special heat stress particularly when the wet clutches 28, 29 are under slipping conditions. The pressure medium metered in this way cools the friction lamellae 40, 41 and flows radially outward, from where it is scooped up by the scoop pipe 14 connected fixedly to the transmission housing 22 by means of the guide pins 83 and is fed to the transmission sump via the discharge line 84.

A friction device 85 may be provided between the torsional vibration damper 12 and the input part 13 of the wet clutches 28, 29. For this purpose, a friction ring 87 can be acted upon by means of circumferentially distributed axially raised pins 86 of the lamella carrier 34 and is centered by means of the holding ring 88 fastened to the housing part 6 and is braced by means of the axially active energy accumulator 89, which may, for example, be a cup spring, as shown, with respect to said holding ring. Additionally or alternatively, the friction device 85 may serve as centering for the two wet clutches 28, 29 in the housing 8 before final assembly, as long as said friction device is not yet centered on the transmission input shaft 49.

Figure 2:
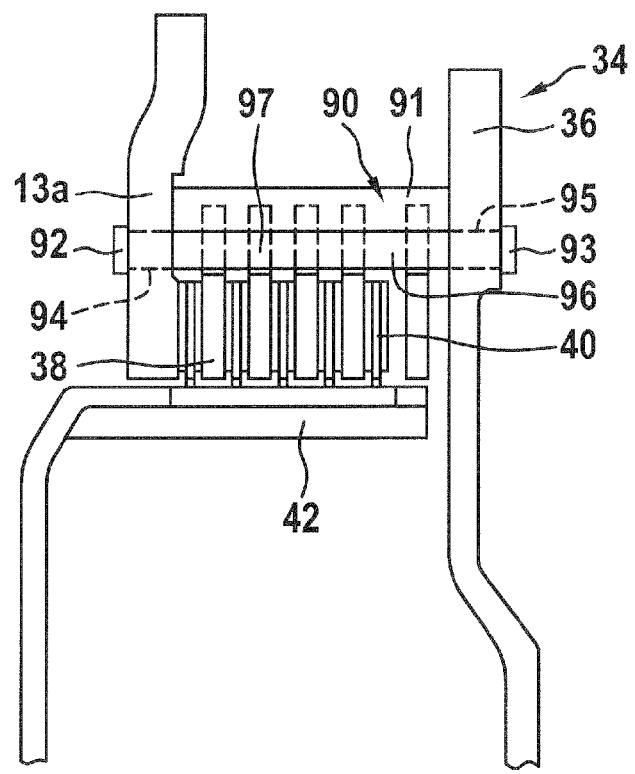
FIG. 2 shows the built-up lamella carrier of FIG. 1 in detail.

FIG. 2 shows the built-up lamella carrier 34 of FIG. 1 in detail as a sectional illustration. The lamella carrier 34 is formed from the flange part 13a, the carrier disk 36 and circumferentially distributed connection elements 90 arranged axially between them. In the exemplary embodiment shown, the connection elements 90 are formed from prebent sheet metal parts 91 having axially extending rivet studs 92, 93 which are led through corresponding orifices 94, 95 in the flange part 13a or carrier disk 36 and are riveted from outside against this. The circumferentially pointing ends of the sheet metal parts 91 are counted or bent radially inward to form tooth flanks 96, so as to form, in the cross section of the sheet metal parts 91, a tooth flank profile, on which are suspended the lamellae 38 which, for this purpose, have a complementary outer profile 97, so that the lamellae 38 are centered on the lamella carrier 34 and the torque prevailing at the lamella carrier 34 is transmitted to the lamellae 38. The lamellae 38 are layered alternatively with the frictional lamellae 40 which are suspended in the output-side lamella carrier 42 fixedly in terms of rotation and so as to be displaceable axially to a limited extent.

Figure 3:
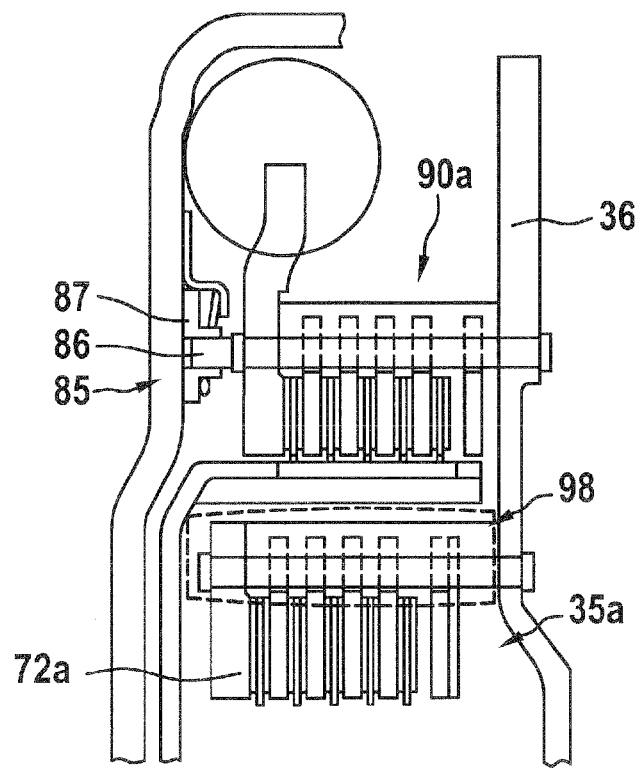
FIG. 3 shows a detail with two built-up lamella carriers.

FIG. 3 shows a version alternative to the deep-drawn lamella carrier 35 of FIG. 1, in the form of the lamella carrier 35a in a built-up version. The lamella carrier 35a has connection elements 98 which are designed comparably to the connection elements 90 of FIG. 2 and are riveted between the end lamella 72a and the carrier disk 36. Furthermore, FIG. 3 shows a connection element 90a with an axially prolonged pin 86 which replaces the connection element 90 of FIG. 2, for example, in a plurality of circumferential positions and thereby enables the lamella carrier 34 (FIG. 1) to engage with the friction device 85, in that the pins 86 drive the friction ring 87 in the circumferential direction with respect to the housing 8 (FIG. 1) of the clutch unit and thus control the friction device.

Figure 4:
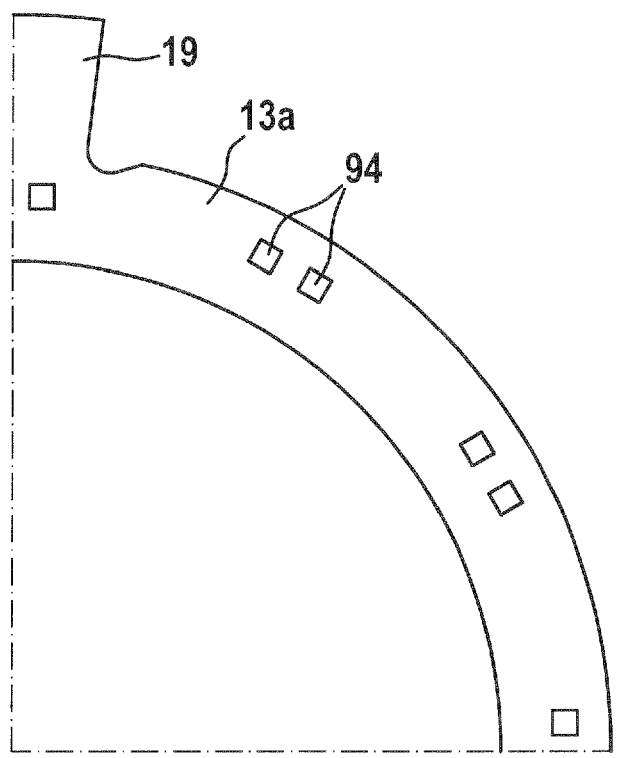
FIG. 4 shows a view of a cutout of the flange part of FIG. 1.

FIG. 4 shows a cutout from the flange part 13a with the driver 19 for the energy accumulators 11 of the torsional vibration damper 12 (FIG. 1) and the orifices 94 for receiving the connection elements 90 by means of the rivet studs 92 of FIG. 2. The cross section of the orifices 94 is polygonal, here square, and complementary to the likewise square cross sections of the rivet studs 92 (FIG. 1). In the exemplary embodiment shown, each connection element 90 (FIG. 2) has two adjacent rivet studs, so that in each case at least two adjacent orifices 94 are provided per connection element.

Figure 5:
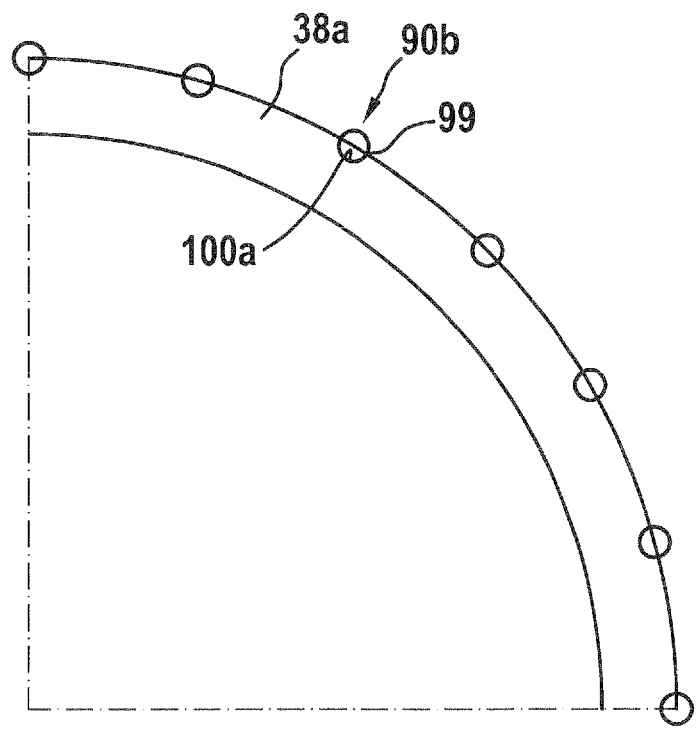
FIG. 5 shows a configuration of the rotary take-up of the lamellae.

FIG. 5 shows a cutout from a lamella 38a which is similar to the lamella 38 of FIG. 1 and is produced, for example, from steel. In relation to the version of the clutch unit 1 of FIG. 1, the lamellae 38a are suspended in connection elements 90b which are changed with respect to the connection elements 90, 90a of the lamella carrier 34 of the radially outer wet clutch 28 and/or with respect to the connection elements 98 of the lamella carrier 35 of the radially inner wet clutch 29 and which are formed from stepped bolts 99. For this purpose, circumferentially distributed recesses 100a in the form of segments of a circle are provided at the lamellae 38a in a number corresponding to the number of stepped bolts 99, so that the lamellae 38a are centered and driven on the lamella carrier, not shown, via the stepped bolts 99. Since the bearing surfaces of the stepped bolts 99 on the bearing surfaces of the lamella 38a are provided by the recesses 100a and are smaller in comparison with the connection elements of FIGS. 1 to 4, the number of stepped bolts 99 is increased with respect to the number of these connection elements and amounts in the exemplary embodiment shown to twenty four.

Figure 6:
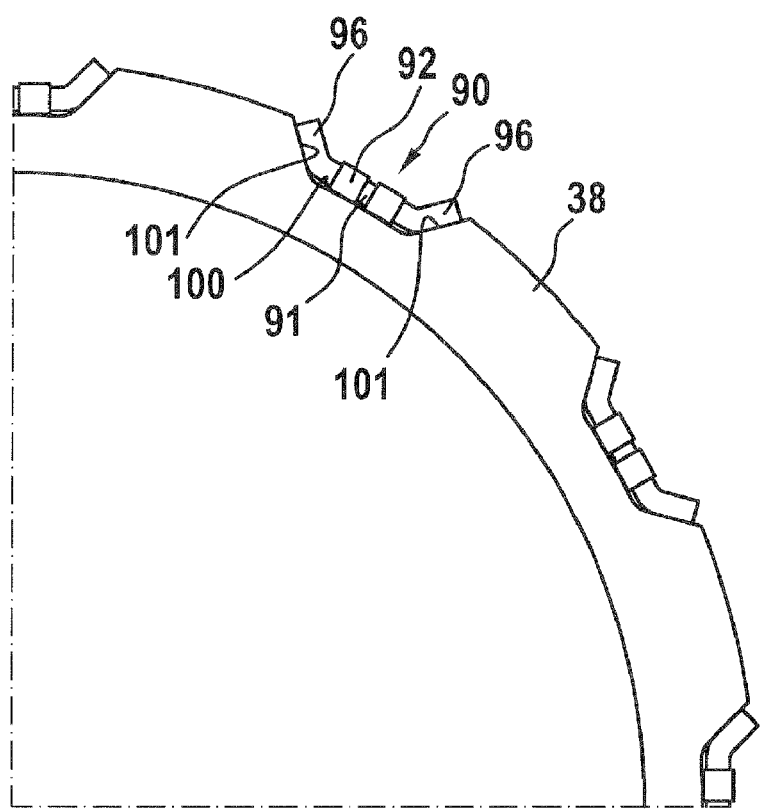
FIG. 6 shows a rotary take-up of the lamellae which is alternative to FIG. 5.

FIG. 6 shows a view of a cutout from a lamella 38 of FIGS. 1 to 4. Circumferentially distributed recesses 100 complementary to the connection elements 90 are provided in the lamella 38 and have in each case bearing surfaces 101 which run radially outward obliquely and make a form fit in the circumferential direction with the tooth flanks 96 of the sheet metal parts 91, so that a rotary take-up of the lamella 38 when the connection elements 90 are subjected to rotary action by the lamella carrier, not shown, takes place. For this purpose, the rivet studs 92 or rivet studs 93 (FIG. 2), in a view from the other direction, are riveted to the orifices 94 of the flange part 13a or the orifices 95 of the carrier disk 36 (FIGS. 2 and 4).

Figure 8:
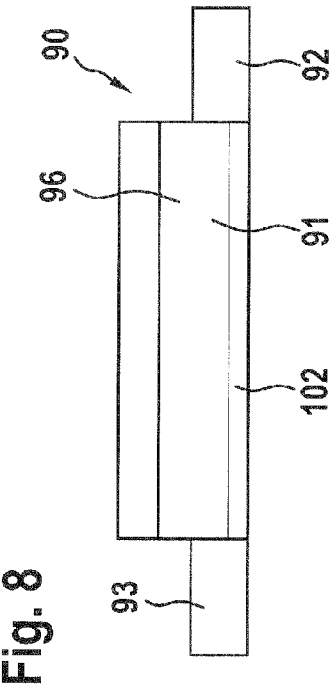
FIGS. 7 to 9 show a connection element for the lamella carrier in various views.
Figure 7:
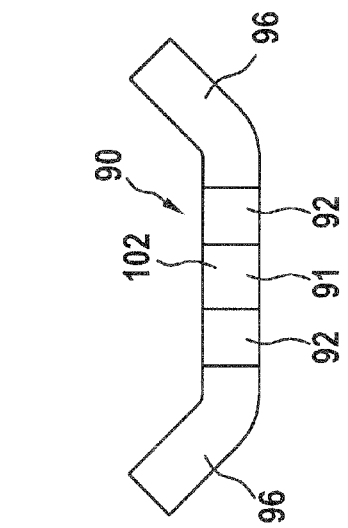
Figure 9:
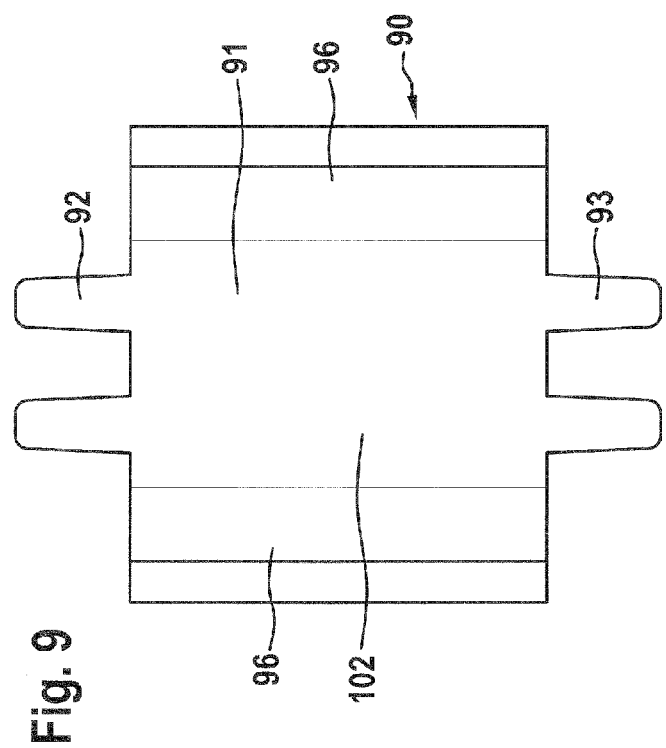

FIGS. 7 to 9 show views of a not-yet-riveted connection element 90 from three directions, and it is illustrated in FIGS. 1 to 4 in the installed, that is to say riveted state. The connection element 90 formed from the stamped and preformed sheet metal part 91 has, for riveting to the end faces, in each case at least two rivet studs 92, 93 which in cross section preferably, and as illustrated, have a square design. In this case, the rivet studs 92, 93 are widened axially out of the planar base surface 102 with respect to which the tooth flanks 96 are designed to be angled.

FIGS. 10 to 12 show a variant, alternative to the connection element 90 illustrated in FIGS. 7 to 9, of a connection element 90c in a view from three directions in the riveted state with the rivet heads 103, 104 in each case widened with respect to the rivet studs 92a, 93a. In contrast to the connection element 90 of FIGS. 7 to 9, the rivet studs 92a, 93a are arranged on the tooth flanks 96 and therefore are in each case at a greater distance from one another. As a result of this further distance, a greater stability in the fastening of the connection elements 90c to the flange part 13a or to the carrier disk 36 can be achieved.

Figure 13:
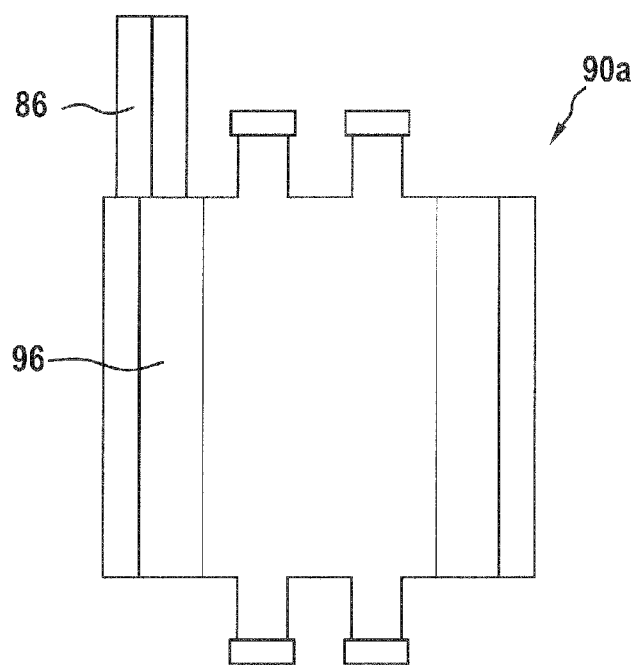
FIG. 13 shows a view of a connection element for the lamella carrier for controlling a friction device.

FIG. 13 shows a view of the connection element 90a of FIGS. 1 and 3 in the riveted state. The pin 86 for acting upon and controlling the friction device 85 of FIGS. 1 and 3 is widened axially out of the tooth flank 96.

Figure 14:
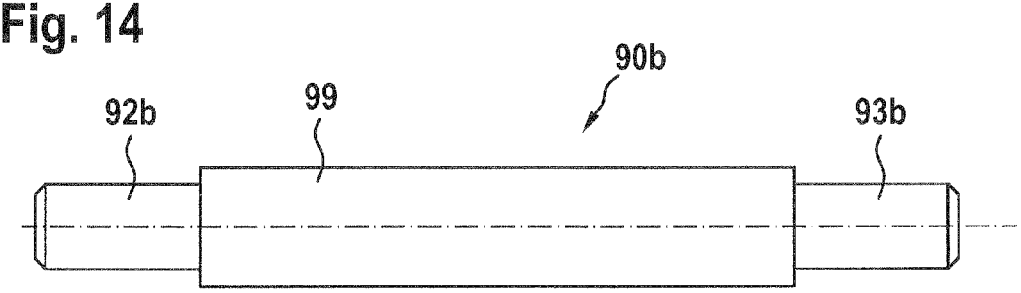
FIGS. 14 and 15 show a view of a connection element configured as a stepped bolt in an open and a closed state.
Figure 15:
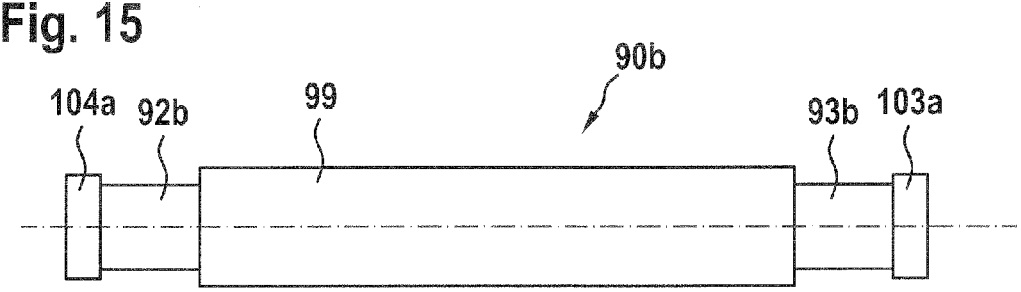

FIGS. 14 and 15 show the stepped bolt 99 of FIG. 5 in a view in the non-riveted state (FIG. 14) and riveted state with rivet studs 92b, 93b arranged on both sides and, in the riveted state, with the rivet heads 103a, 104a. The stepped bolts 99 are preferably produced by cutting, so that the rivet studs 92b, 93b are designed with a round cross section.

LIST OF REFERENCE SYMBOLS

1 Clutch Unit
2 Axis of Rotation
6 Housing Part
7 Housing Part
8 Housing
11 Energy Accumulator
12 Torsional Vibration Damper
13 Input Part
13a Flange Part
14 Scoop Pipe
16 Annular Flange Part
17 Driver
18 Driver
19 Driver
20 Crankshaft
21 Drive Plate
22 Transmission Housing
23 Rolling Bearing
24 Axial Extension
25 Toothed Ring
26 Sealing Disk
27 Seal
28 Wet Clutch
29 Wet Clutch
30 Bow Spring
31 Bow Spring
32 Shoulder
33 Wear Protection Shell
34 Lamella Carrier
35 Lamella Carrier
35a Lamella Carrier
36 Carrier Disk
37 Clutch Hub
38 Lamella
38a Lamella
39 Lamella
40 Friction Lamella
41 Friction Lamella
42 Lamella Carrier
43 Lamella Carrier
44 Hub
45 Hub
45a Energy Accumulator 45b Securing Disk
46 Toothing
47 Toothing
48 Transmission Input Shaft
49 Transmission Input Shaft
50 Torsional Vibration Absorber
51 Centrifugal Pendulum
52 Centrifugal Weight
53 Rolling Bearing
54 Rolling Bearing
55 Rolling Bearing
56 Run-On Disk
57 Run-On Disk
58 Carrier Part
59 Lubricating Oil Groove
60 Rolling Bearing
61 Rolling Bearing
62 Sealing Plate
63 Shoulder
64 Securing Ring
65 Run-On Disk
66 Carrier Part
67 Shim Disk
68 Run-On Disk
69 Piston
70 Piston
71 End Lamella
72 End Lamella
72a End Lamella
73 Rotary Leadthrough
74 Rotary Leadthrough
75 Supply Line
76 Supply Line
77 Pressure Chamber
78 Pressure Chamber
79 Energy Accumulator
80 Energy Accumulator
81 Supply Line
82 Supply Line
83 Guide Pin
84 Discharge Line
85 Friction Device
86 Pin
87 Friction Ring
88 Holding Ring
89 Energy Accumulator
90 Connection Element
90a Connection Element
90b Connection Element
90c Connection Element
91 Sheet Metal Part
92 Rivet Stud
92a Rivet Stud
92b Rivet Stud
93 Rivet Stud
93a Rivet Stud
93b Rivet Stud
94 Orifice
95 Orifice
96 Tooth Flank
97 Outer Profile
98 Connection Element
99 Stepped Bolt
100 Recess
100a Recess
101 Bearing Surface
102 Base Surface
103 Rivet Head
103a Rivet Head
104 Rivet Head
104a Rivet Head

The invention claimed is:

1. A clutch unit for a drive train having a drive unit and a transmission, comprising:
a housing;
at least one wet clutch arranged in the housing and driveable by the drive unit, the at least one wet clutch has an input-side lamella carrier, an output-side lamella carrier, and lamellae and friction lamellae, which are arranged radially one above another, are received in the input-side lamella carrier and the output-side lamella carrier and alternate in an axial direction;
a clutch hub arranged in the housing;
a carrier disk, which is received fixedly on the clutch hub and connected fixedly to the input-side lamella carrier; and
a torsional vibration absorber arranged on the carrier disk,
wherein the at least one wet clutch has an input flange part and the input-side lamella carrier is assembled from circumferentially distributed connection elements which connect the flange part to the carrier disk in an axially spaced-apart and play-free manner, and
wherein the connection elements have end faces, and at least two rivet studs are arranged on the end faces, adjacent to one another in a circumferential direction.

2. The clutch unit as claimed in claim 1, wherein the rivet studs rivet the connection elements to the flange part and the carrier disk, the rivet studs have a polygonal cross-section which passes through orifices in the flange part and in the carrier disk and the rivet studs are riveted on sides facing away from the connection elements.

3. The clutch unit as claimed in claim 1, wherein two wet clutches are arranged above one another.

4. The clutch unit as claimed in claim 1, wherein the torsional vibration absorber is a centrifugal pendulum.

5. A clutch unit for a drive train having a drive unit and a transmission, comprising:
a housing;
at least one wet clutch arranged in the housing and driveable by the drive unit, the at least one wet clutch has an input-side lamella carrier, an output-side lamella carrier, and lamellae and friction lamellae, which are arranged radially one above another, are received in the input-side lamella carrier and the output-side lamella carrier and alternate in an axial direction;
a clutch hub arranged in the housing;
a carrier disk, which is received fixedly on the clutch hub and connected fixedly to the input-side lamella carrier; and
a torsional vibration absorber arranged on the carrier disk,
wherein the at least one wet clutch has an input flange part and the input-side lamella carrier is assembled from circumferentially distributed connection elements which connect the flange part to the carrier disk in an axially spaced-apart and play-free manner, and
wherein the flange part forms an end lamella of the at least one wet clutch.

6. A clutch unit for a drive train having a drive unit and a transmission, comprising:
a housing;
at least one wet clutch arranged in the housing and driveable by the drive unit, the at least one wet clutch has an input-side lamella carrier, an output-side lamella carrier, and lamellae and friction lamellae, which are arranged radially one above another, are received in the input-side lamella carrier and the output-side lamella carrier and alternate in an axial direction;
a clutch hub arranged in the housing;
a carrier disk, which is received fixedly on the clutch hub and connected fixedly to the input-side lamella carrier;
a torsional vibration absorber arranged on the carrier disk; and
a torsional vibration damper, which is active between the housing and the at least one wet clutch, the torsional vibration damper being connected in parallel to the torsional vibration absorber via the connection elements, wherein the at least one wet clutch has an input flange part and the input-side lamella carrier is assembled from circumferentially distributed connection elements which connect the flange part to the carrier disk in an axially spaced-apart and play-free manner.

7. The clutch unit as claimed in claim 6, further comprising a friction device connected in parallel to the torsional vibration damper, one of the connection elements having at least one pin which is widened axially in a direction of the housing and controls the friction device.

* * * * *